No. 607,540. Patented July 19, 1898.
H. S. CHASE.
ELECTRICAL RESISTANCE.
(Application filed Jan. 11, 1897.)
(No Model.) 2 Sheets—Sheet 1.
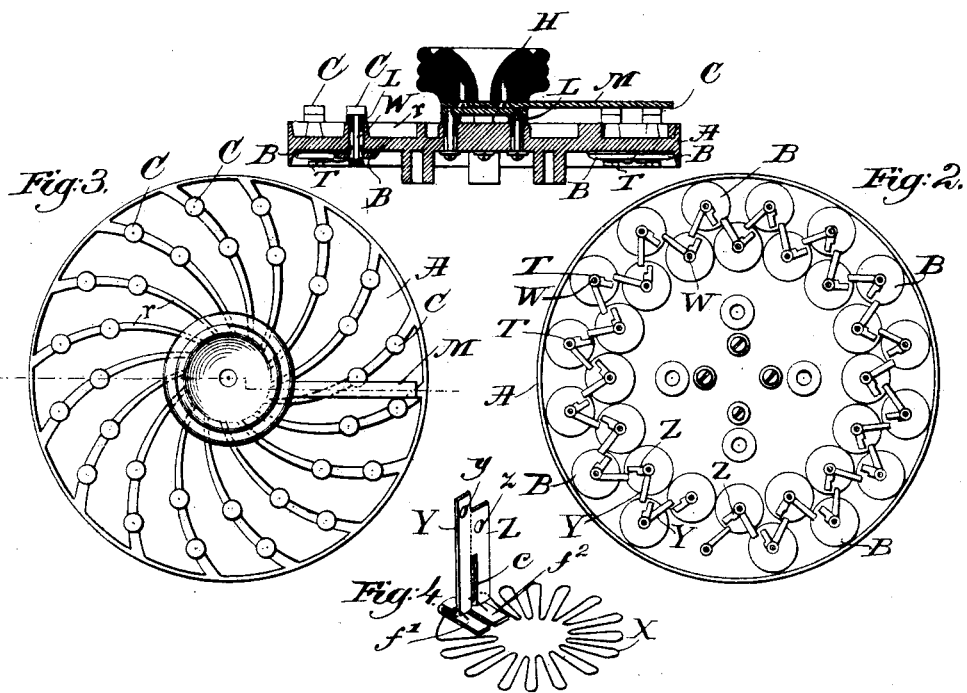

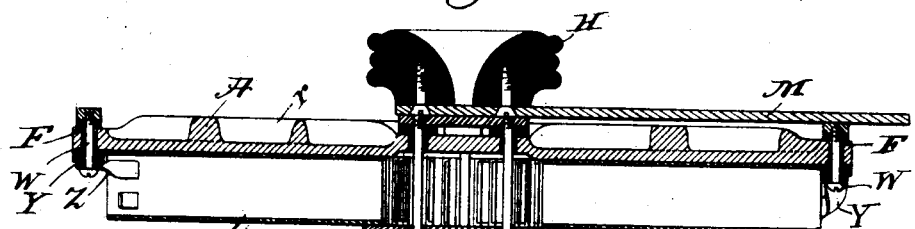
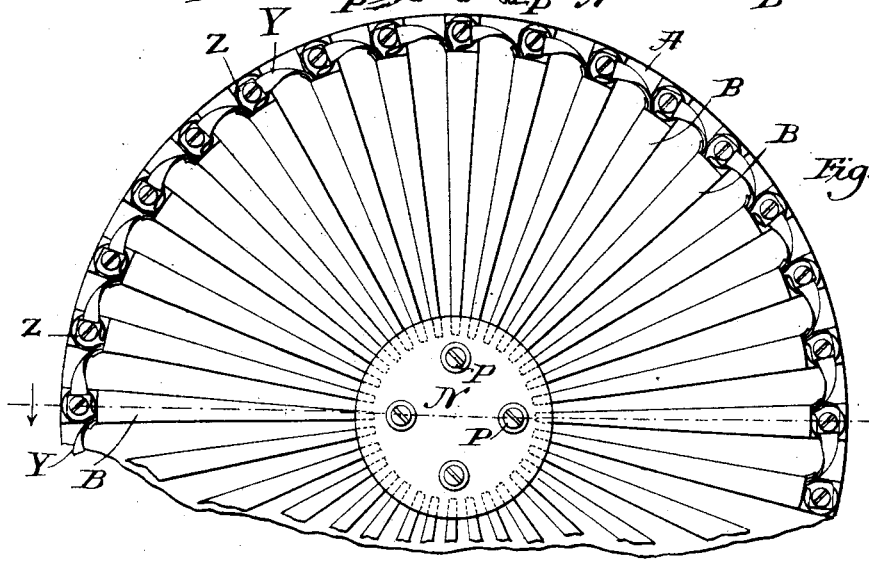
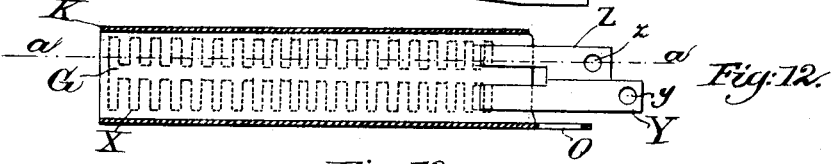
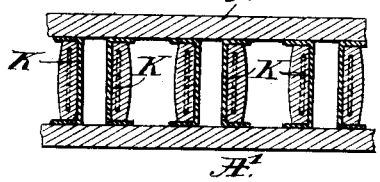

UNITED STATES PATENT OFFICE.

HARVEY S. CHASE, OF BOSTON, MASSACHUSETTS, ASSIGNOR, BY MESNE ASSIGNMENTS, TO THE AMERICAN ELECTRIC HEATING CORPORATION, OF SAME PLACE.

ELECTRICAL RESISTANCE.

SPECIFICATION forming part of Letters Patent No. 607,540, dated July 19, 1898.

Application filed January 11, 1897. Serial No. 618,711. (No model.)

*To all whom it may concern:*

Be it known that I, HARVEY S. CHASE, a citizen of the United States, residing at Boston, in the county of Suffolk and State of Massachusetts, have invented a new and useful Improvement in Electrical Resistances, of which the following is a specification.

This invention relates to apparatus by which electrical energy is converted into heat energy and which are usually classified either as "electric heaters" or "rheostats," and is especially applicable to that class of heaters or rheostats in which an electrical resistance is embedded in a coating of enamel upon a suitable support from which the enamel insulates the conductor. Resistances of this sort have already gone into extensive use and are commonly known as "enamel" resistances.

The invention herein described relates to improvements in the construction of electrical-resistance apparatus whereby such apparatus may be more cheaply and reliably made than heretofore and whereby the construction of special resistances, as for special necessities arising in connection with the operation of electric light or power plants, is rendered at once easy and susceptible of substantially perfect accuracy. The repair also of electrical-resistance apparatus will be found to be greatly facilitated by the use of the inventions and improvements herein described.

Generally speaking these improvements are secured by subdividing the electrical-resistance apparatus into a convenient number of constituent elements, and in part these inventions and improvements comprise new modes of manufacture of electrical resistances and details of construction of such resistances.

For the purposes of describing these inventions a rheostatic apparatus may be considered as typical of the various forms and uses to which the inventions may be found adaptable, and consequently the following description will be devoted to the details of construction of a rheostatic apparatus.

In rheostats involving the enamel construction as heretofore manufactured the resistance-wires have been embedded in a coating of enamel upon and adherent to a metallic base-plate of sufficient bulk to perform the functions of a framework or support and at the same time to provide ready means for carrying off the heat developed in the apparatus. One side of such base-plate or support is usually covered mostly, if not wholly, with a coating of enamel which contains the loops of resistance-wire and the other side serves as a support for the contact points or buttons and switch devices. While this form of rheostat has proven to be compact and efficient under favorable conditions, yet in ordinary operation it has been found subject to many practical difficulties; and it is the object of the within-described improvements and inventions to overcome so far as possible these difficulties. In the ordinary enamel rheostat the resistance-wires are in series and the ends of each two adjoining wires or loops are connected with the contact-points on the face of the base-plate and all the resistances are embedded in the same coating of enamel upon the plate. In order to manufacture such a rheostat, it is necessary as a usual thing first to provide the base-plate with a coat of enamel and then to arrange upon the surface of this enamel coating the loops of wire in such manner that they shall not touch each other or be dislodged from position. Where a great number of these loops are placed upon the enameled plate, the danger of short circuits brought about by dislodgment is great. After the loops of wire have been so arranged a second coat of enamel is applied over the wires, and the application of this second coat offers another opportunity for the loops of wire to become disarranged and displaced. If during the manufacture of such a resistance-plate any one of the many loops of resistance-wire becomes grounded by touching the base-plate or makes an accidental short circuit by touching its neighbor resistance, the mischief is done and cannot practically be remedied. An accident in the construction of such a rheostat necessitates the entire reconstruction of the apparatus, for its mode of construction renders repair impracticable, so that the penalty for an error, which may not be due to want of skill on the part of the workman employed, is usually the total loss of the entire rheostat. Almost all the rheostats which are made are constructed to meet some special requirement, so that each rheostat must have its peculiar individual characteristics in order to suit the needs of the person who is to use it. The expense which is invariably incident to the manufacture of special articles of any kind is therefore a constant feature of the manufacture of rheostats, and its expense is liable to be greatly increased if to the natural and normal cost of manufacture there is added the expense due to the frequent occurrence of faulty construction. In these old forms of enamel rheostats there is liability, as in all rheostatic apparatus, to overheating at various points, and perhaps to burning out of the resistance-conductor, and if in an enamel rheostat which involves the construction above described one of the resistance-loops is burned out the whole rheostat is to all practical intents destroyed. The enamel is so closely adherent to the base-plate and so tough and hard that it is practically impossible to repair one loop of the resistance-wires without destroying the entire structure. The chief practical fault, therefore, which has characterized the enamel resistance is due to the circumstance that the resistances in series when made up complete and ready for sale for special requirements have constituted practically a single integral plate which is difficult to construct accurately and which when constructed is practically unsusceptible of repair. By the within-described inventions and improvements a rheostat construction is provided in which a convenient subdivision of the elementary resistances makes the resistance easy to construct, readily adaptable for general or special requirements, and less susceptible of error in construction than the older forms above described. At the same time the resistances are placed in as intimate contact with the heat-conducting support as in the older forms, so that no valuable feature possessed by the older forms of enamel rheostat is sacrificed by the adoption of these improvements.

In the drawings, Figure 1 is a cross-section of a rheostat embodying the improvements to be described. Figs. 2 and 3 are the back and front, respectively, of the rheostat shown in Fig. 1. Fig. 4 shows the construction of a resistance-loop such as is used to make up a constituent resistance element of the rheostat shown in Figs. 1 to 3, inclusive. Figs. 5, 6, and 7 show in plan view and cross-section a form of resistance element which may conveniently be employed. Fig. 8 shows the manner of attaching the resistance element to the base-plate of the rheostat and to the contact-button which is used in connection with the switch-arm. Figs. 9 and 10 show a cross-section and bottom view, respectively, of another form of rheostat differing from that shown in Figs. 1 to 3, inclusive, in the manner in which the constituent resistance elements are disposed upon the base-plate or support. Figs. 11 and 12 show in top view and in plan view, respectively, one of the resistance elements which make up the construction of Figs. 9 and 10. Fig. 13 shows in cross-section another manner of arranging resistances in substance similar to the mode shown in Figs. 9 and 10.

The structure shown in Figs. 1 to 3, inclusive, involves the use of a conductive base-plate or support, the constituent resistance elements disposed thereon, contact pieces or buttons in electrical contact with the resistance elements, and a switch-arm which sweeps over the contact-pieces in the manner well known in rheostat constructions. The base-plate A is constructed, preferably, of cast-iron and made with corrugations or ribs $r$, as shown in Fig. 3, for the purpose of affording a larger heat-radiating surface. The back of this base-plate A is made smooth, and to this smooth surface are attached the resistance elements B. The attachment of the resistance elements to plate A is effected by means of metallic bolts W, (see Fig. 8,) which pass through holes F in the plate A. The manner of attachment will be alluded to in another paragraph. The resistance elements B are constructed by the following method.

A sheet-metal disk or button E is stamped to provide a stiffening or backing for the enameled resistance and is shown full size in Figs. 5 to 8, inclusive. This metallic blank or button may be a flat disk, as in Fig. 7, but is preferably constructed with an annular projection at the center, which shows itself in the back of the button as a slightly-raised ring $e$, as shown in Figs. 5 and 8. The resistance is formed, preferably, of German-silver wire, which is bent into the form of a circular ruffle, as shown at X in Fig. 4. This resistance-loop X might be expected to exhibit all the susceptibility for being displaced, warped, or bent out of shape which has been observed in such resistance-loops as heretofore used were it not for the arrangement of the terminal pieces Y Z, which is as follows:

The mode which I prefer consists in taking a piece of copper ribbon, cutting holes $y$ $z$ in one end of it, then making a longitudinal cut on the other end, (shown at $c$,) and then bending the end which is bifurcated by the slit $c$ into a double angle, which serves to make a pair of feet $f'$ $f^2$ for the terminal. Upon the feet $f'$ $f^2$, respectively, the ends of the resistance-loop X are laid in such manner that when the part which forms the feet is pressed flat the terminal ends of the conductor X will be securely bound to the copper ribbon Y Z. This terminal ribbon Y Z thus holds the resistance-loop by what would otherwise be its loose ends and prevents it from springing out by reason of the heat to which it is to be subjected and renders it easy to handle in the enameling process by which the resistance element B is made. A made-up resistance-loop, with its terminal pieces, as shown in Fig. 4, is placed in or on an enamel coating G, which rests on the blank or button E. The flat surfaces of the feet $f'$ $f^2$ offer so broad a support to the resistance-loop and its terminal piece that there is little danger of its weight displacing any of the enamel when the latter is in a fluid or semifluid condition. The terminal pieces Y Z offer a convenient handle by which the resistance-loops X can be manipulated and project up out of the enamel coating, so that they afford a ready means of making electrical connections when the resistance element is finished. When the enamel coating G which envelops the resistance X has been fused and then allowed to cool, the resistance element B is ready for application to the base-plate A. A single clip of the shears suffices to separate the branches of the terminal pieces Y Z and to make the resistance-piece B ready for insertion in an electric circuit. This mode of preparing the resistance-loop consists, substantially, in temporarily binding together the conductors which are to form the two terminal leads for the resistance-loop. The manner above described, in which the two terminals consist at first of a single copper or other metallic strip, is to my mind the most convenient; but the same result can be attained by means differing in detail, though not in substance. For instance, two copper wires might be attached to the terminals and then twisted together, so as to form a secure holder for the resistance-loop, and then after the enameling is done the two wires could be untwisted and serve for the terminals.

The insertion of the resistance-piece into metallic circuit is effected as follows: The button E is placed upon the back of the base-plate A, preferably by the insertion of the annular projection $e$ into the holes F in the base-plate. The shorter terminal Z is then bent back until the hole which has previously been punched therein comes over the hole in the center of the resistance-piece B. The bolt W, which is electrically integral with the contact-button C, is passed through the hole F in the base-plate and also through the hole in the end of the terminal piece Z. A nut T serves to bind the several parts together and to press the resistance-piece B into close contact with the base-plate A.

When the base-plate A is made of electro-conductive material, as iron, it is necessary of course to insert an insulating-bushing, which may be made of lava or other convenient insulating material, as at L, between the button or contact-piece C and the plate A.

In Fig. 2 is shown the arrangement of a number of resistance elements like B upon the back of a base-plate or support. The terminal pieces Y are carried from each resistance element in the series and the terminal Z of one resistance element secured in electrical contact with the terminal element Y of the next resistance element of the series by a bolt W, which, as shown in Fig. 8, is in contact with the button C.

On the face of the rheostat the contact pieces or buttons C are shown disposed as in Fig. 3, and a switch-arm M, connected to the hand-wheel H, sweeps over the contact-buttons C, enlarging or diminishing the amount of resistance of the circuit by its passage one way or the other, as in the ordinary case.

The resistance elements need not be constructed in the form of a circular button, as shown in Figs. 5 to 8, inclusive, but may with convenience and economy be made in other forms, the preference in all cases being given to that form which lends itself most readily to compactness in construction, accessibility of parts, facility of repair, and the adequacy with which the heat developed within the resistance is communicated to conductive parts of the apparatus and thus dissipated. It is doubtless desirable in many cases to provide not only for the conduction away of the heat developed in the apparatus by means of contact with a large mass of metal, as of the base-plate A, but also to provide for radiation into the air or for the passage of a current of air among and over the resistance elements.

A compact and convenient form of rheostat which combines all the advantages named is shown in Figs. 9 to 13, inclusive. There the resistance elements are attached, as before, to a base-plate, (marked A.) The form of resistance elements is shown in Figs. 11 and 12 to be a blank or packing preferably stamped out of sheet metal, as before, but in the form of a channel or angle iron with tapering sides. The loop of resistance shown in Fig. 12 instead of being circular is elongated; but the terminal pieces Y Z are constructed and secured to the ends of the resistance-wire in substantially the same way as the terminal pieces shown in Fig. 4. A glance at Fig. 12 will suffice, in connection with the description of Fig. 4, to instruct an observer in the manner of applying the resistance to the channel or angle form support. Fig. 11 is a section of Fig. 12 on the line $a\,a$. The enamel coating G is applied on the inside of the channel-piece K and embeds the resistance X in the manner described. One of the sides of the channel-piece K projects beyond the back piece and is provided with a hole O. The holes F in the support or base-plate A provide means whereby the resistance elements K are attached to the base-plate and the resistance elements are disposed around the back surface of the base-plate A like the spokes of a wheel, the holes O falling opposite the holes F. A plate N and bolts or screws P at the center of the rheostat serve to clamp down the inner ends of the resistance-pieces K. The terminals Y Z having been cut apart, the Y end of one resistance and the Z end of the next are clamped together under the end of the bolt W, which is, as before, in electrical contact with the button C. A switch-arm M and hand-wheel H constitute the remainder of the apparatus, except, of course, for the usual connections by which the rheostat is thrown into circuit.

Instead of attaching the channel-form resistance elements K, as shown in Figs. 9 and 10, they may be placed between two plates A A', preferably of cast-iron, as shown in Fig. 13. In this case the channel-pieces K, which form part of the resistance elements, may be straight instead of tapered channels where the resistance is assembled in a rectangular instead of the circular form shown. This arrangement between plates in longitudinal form is found advantageous for motor-regulator constructions; but whatever the form of construction or mode of assemblage the underlying idea of a subdivision of these enameled resistance elements lends facility of construction and repair and accuracy of results to the aid of the manufacturer.

The arrangement of resistance elements in the channel-iron form enables the electrical instrument-maker to place the heated portions of the rheostat both in conductive contact with the base-plate and in a position where the circulation of air will still further permit the distribution of heat. The principal advantage of the channel-iron form is believed to reside in this feature as well as in the advantages derived from compactness of construction.

The practical advantages to be derived from the above-described mode of rheostat construction are many. Instead of having to expend great care and labor in making up special or standard forms of resistance-plates, any one of which may, in the hands of a user, develop fatal defects, the manufacturer can make and keep in stock a few standard base-plate castings and any desired number of resistance buttons or strips, each conveniently marked with figures or symbols which denote the measure of its resistance, and then, on the receipt of a special order for a peculiarly-arranged resistance, has only to compute the number and arrangement of the resistance elements in stock which are needed to construct the resistance, attach them to one of the base-plate castings, make the connections, and ship the goods by return freight. Up to this time from ten to thirty days have been allowed as the necessary time within which to fill special orders. It is no exaggeration to say that with the arrangement herein described from half an hour to three hours will be ample time.

In the hands of the user this form of resistance with isolated and subdivided coils has its obvious advantages. Should one of the buttons burn out, if the user of the resistance-plate has a similar button in his repair-kit he can restore the resistance-plate to good condition in a few minutes. If he has not, his only need is to note the character of the resistance which has been injured by reading its number or mark, order another, and get his repair part from the manufacturer by return mail.

Having thus described my invention, what I claim, and desire to secure by Letters Patent, is as follows:

1. In an electrical-resistance device, the combination with a base or support of heat-conductive material of a plurality of separated resistance elements in electrical series, each complete in itself, and attachable independently one of another to and in heat-conductive contact with the said base or support, each of the said elements being incased in an envelop of insulating material, the envelop of each element being independent of those of the others.

2. In an electrical-resistance device, the combination with a base or support of heat-conductive material of a plurality of separated resistance elements in electrical series, each complete in itself, and attachable independently one of another to and in heat-conductive contact with the said base or support, the means employed to secure each of said resistance elements mechanically to the base or support being the electrical connection between the said element and a switch, each of said elements being incased in an envelop of insulating material, the envelop of one element being independent of those of the others, and a switch, adapted to operate in connection with the resistance elements, in substantially the manner set forth.

3. In an electrical resistance device, the combination with a base-plate or support of a plurality of resistance elements, each resistance element consisting of a perforated metallic backing, a loop of resistance material and an enamel coating on the metallic backing which incloses and insulates the loop of electroconductive resistance material, terminal leads in electrical contact with the resistance-loop and emerging from the enamel coating, each resistance element secured to the base-plate or support by a fastening passing through the perforation in the backing, a plurality of contact plates or buttons secured to the base-plate or support and in electrical connection with the terminals of the resistance-pieces aforesaid, and a contact-switch, so located and adapted as to pass over the contact plates or buttons in succession, substantially as described.

4. In an electrical-resistance device, the combination with a flat base or support, of a plurality of separated resistance elements, each element complete in itself, and attachable independently one of another to the said base or support, each of the said elements consisting of a flat button of insulating material enveloping the resistance material, being secured to the base or support in such manner that the surfaces of the base and button substantially coincide.

5. In an electrical-resistance device, the combination with a base-piece or backing of a resistance-loop having its ends secured to terminal leads which are bound together, but capable of easy separation, the said resistance-loop being enveloped in an insulating material secured to the base-piece or backing.

6. In an electrical-resistance device, the combination of a resistance-loop having its ends secured to terminal leads which are bound together but capable of easy separation, and an enamel envelop surrounding and insulating the resistance-loop.

7. In an electrical-resistance device, the combination with a base or support of a plurality of resistance elements, each resistance element consisting of a metallic backing bent to form an angle-plate, a loop of resistance material and an enamel coating on the metallic backing, which incloses and insulates the resistance-loop, and terminal leads in electrical contact with the resistance-loop and emerging from the enamel, each of said resistance elements secured to the base or support in such manner that the enameled portion of the metallic backing stands at an angle with the surface of the base-piece, contact-buttons secured to the base-piece and in electrical connection with the terminal leads of the said resistance-pieces, and a movable contact-switch arranged to pass over said contact-buttons and to make contact therewith, substantially as described.

8. In an electrical-resistance device, a base or support, a plurality of separated resistance elements in electrical series, each complete in itself, the said elements attachable, independently one of another to said base or support, each of said elements consisting of an electroconductive resistance embedded in an enamel envelop on a sheet-metal backing with electroconductive terminals in contact with the said resistance and emerging from the enamel envelop, and provided with means whereby it is secured to the said base or support in heat-conductive contact therewith and in electrical connection with an electroconductive contact point or button.

9. In a rheostat, the combination of a cast-iron support, and several separable steps of resistance so attached to the said support that the resistance material lies in close proximity to the support practically throughout its length, whereby a large portion of the heat energy developed in said steps under operative conditions, will be rapidly transmitted to said cast-iron support, substantially as described.

In testimony whereof I have signed my name to this specification in the presence of two subscribing witnesses.

HARVEY S. CHASE.

Witnesses:
    ELEANOR F. GROLL,
    GRACE M. SHAY.